United States Patent
Desrochers et al.

(10) Patent No.: US 6,989,496 B2
(45) Date of Patent: Jan. 24, 2006

(54) VEHICLE OCCUPANT WEIGHT ESTIMATION APPARATUS

(75) Inventors: Kristopher L. Desrochers, Guelph (CA); Brian Johnson, Waterloo (CA); Fakhri Karray, Waterloo (CA); Otman Adam Basir, Kitchener (CA); Vladimir Filippov, Kitchener (CA)

(73) Assignee: Intelligent Mechatronic Systems Inc., Waterloo (CA)

( * ) Notice: Subject to any disclaimer, the term of this patent is extended or adjusted under 35 U.S.C. 154(b) by 253 days.

(21) Appl. No.: 10/363,748

(22) PCT Filed: Sep. 19, 2001

(86) PCT No.: PCT/IB01/01722

§ 371 (c)(1),
(2), (4) Date: Mar. 6, 2003

(87) PCT Pub. No.: WO02/25229

PCT Pub. Date: Mar. 28, 2002

(65) Prior Publication Data

US 2003/0173120 A1 Sep. 18, 2003

Related U.S. Application Data

(60) Provisional application No. 60/233,523, filed on Sep. 19, 2000, and provisional application No. 60/310,259, filed on Aug. 7, 2001.

(51) Int. Cl.
*B60R 21/32* (2006.01)
*G01G 19/08* (2006.01)

(52) U.S. Cl. .................. 177/144; 180/273; 280/735; 701/45

(58) Field of Classification Search ........... 177/136, 177/144, 210 R; 180/273; 280/735; 701/45
See application file for complete search history.

(56) References Cited

U.S. PATENT DOCUMENTS

| | | | | |
|---|---|---|---|---|
| 3,740,567 A | * | 6/1973 | Atkins | 340/573 |
| 5,626,359 A | * | 5/1997 | Steffens et al. | 280/735 |
| 5,670,853 A | * | 9/1997 | Bauer | 318/286 |
| 5,785,347 A | * | 7/1998 | Adolph et al. | 280/735 |
| 5,871,232 A | * | 2/1999 | White | 280/735 |
| 6,043,736 A | | 3/2000 | Sawahata et al. | 340/438 |
| 6,078,854 A | * | 6/2000 | Breed et al. | 701/49 |
| 6,087,598 A | | 7/2000 | Munch | 177/144 |
| 6,259,167 B1 | * | 7/2001 | Norton | 307/10.1 |
| 6,302,438 B1 | * | 10/2001 | Stopper et al. | 280/735 |
| 6,324,453 B1 | * | 11/2001 | Breed et al. | 701/45 |
| 6,598,900 B2 | * | 7/2003 | Stanley et al. | 280/735 |
| 6,626,359 B2 | | 9/2003 | Haulk | 235/383 |

FOREIGN PATENT DOCUMENTS

WO    WO 97/39920    10/1997

* cited by examiner

*Primary Examiner*—Randy W. Gibson
(74) *Attorney, Agent, or Firm*—Carlson, Gaskey & Olds, PC

(57) ABSTRACT

This invention describes an occupant size and weight detection device consisting of a combination of force/load sensors (1), a head position sensor (2, 3), a multidirectional acceleration sensor (5), and a seat position sensor (4) used to determine the weight of an occupant based on weight distribution, body angle and foot position. The goal of the invention is to determine the weight of an occupant who is sitting in the front seat of a vehicle that is subjected to the dynamic forces resulting from the vehicle moving. This technology can be used in applications such as automotive occupant weight and position sensing for use with safety devices such as airbags.

21 Claims, 2 Drawing Sheets

1 - weight transducers
2 - first electrode
3 - array of second electrodes
4 - seat position sensor
5 - 3 direction acceleration sensor
6 - control unit 1 - weight transducers
2 - first electrode
3 - array of second electrodes
4 - seat position sensor
5 - 3 direction acceleration sensor
6 - control unit

VEHICLE OCCUPANT WEIGHT ESTIMATION APPARATUS

This application is a 371 of PCT/IB1/01722, filed Sep. 19, 2001, which claimed the benefit of U.S. Provisional Applications No. 60/233,523, filed Sep. 19, 2000 and No. 60/310,259 filed Aug. 7, 2001.

BACKGROUND OF THE INVENTION

Vehicle occupant protection systems, which are activated in response to a vehicle crash, for the purpose of mitigating occupant injury are well known in the art. A vehicle may contain automatic safety restraint actuators such as front and side air bags, seat belt pretensioners, and deployable knee bolsters. The occupant protection system may further include a collision/crash sensor for sensing the occurrence of a vehicle crash and for providing an electrical signal indicative of the crash severity.

Several known occupant protection systems include an occupant classification or weight detection system. The occupant classification/weight detection system could consist of occupant size or weight determination on force/load sensors, capacitive/electric field sensors, resistive load distribution sensors, ultrasonic sensors, infrared sensors, and/or image based sensors. A controller, which is connected to one or a combination of these sensors, controls the inflatable protection module in response to the sensed size or weight of the occupant. In response to the sensed occupant size or weight, one or more deployment aspects of the air bag may be adjusted. A protection system with adjustable aspects of deployment is commonly referred to as an "adaptive" protection system. Specifically, if the occupant is so small or light that deploying the air bag will not enhance protection of the occupant, it may be desirable to suppress actuation of the occupant protection module. In such a case, deployment may even be more detrimental than no deployment at all.

In any case, the determination of an occupant's size or weight is an important part of adaptive occupant protection systems. There are several types of size classification or weight determination systems. A system that classifies the occupant based on the strength of an electric field (or the capacitance of the human body) may be fooled if a portion of the signal used to excite the sensor is lost. A system that classifies the occupant based on the load distribution, size, shape and/or orientation of the occupant's posterior may not be reliable because varying people of varying heights and weights may have posteriors with similar size and shape characteristics. A system that relies solely on force/load sensors cannot account for false readings due to external forces such as accelerations or losses due to body angle or foot position. Different obstacles such as a map, a book, or a newspaper could occlude signals from ultrasonic and video based systems. A lighter or cigarette could blind an infrared-based system.

SUMMARY OF THE INVENTION

The present invention is based on the fact that, in an occupant classification or weight detection system, false readings due to external forces and losses due to body angle and foot position can be compensated for, if these factors can be detected and measured reliably and consistently. This invention provides a simple, reliable method of determining these factors and using them in conjunction with force/load sensors to accurately determine an occupant's size and weight.

The system includes a seat-mounted sensor consisting of four force/load transducers and a multi-axis acceleration transducer assisted by a roof mounted occupant head position sensor, which are used to determine the size and weight of an occupant who is sitting in a seat that is subjected to the dynamic forces of a moving vehicle.

The roof mounted head position sensor provides the system with the location of the occupant's head relative to the seat pan. A linear seat position sensor is used to track the position of the seat. The head position sensor and the seat position sensor are used to find the body angle of the occupant. This value is used to bias the weight values read by the weight sensors. The acceleration sensors are used to determine if and how other forces, such as acceleration, are influencing the weight sensor readings. An intelligent controller monitors theses sensors and determines the true weight of the occupant.

DESCRIPTION OF THE PREFERRED EMBODIMENT

Figure 1:
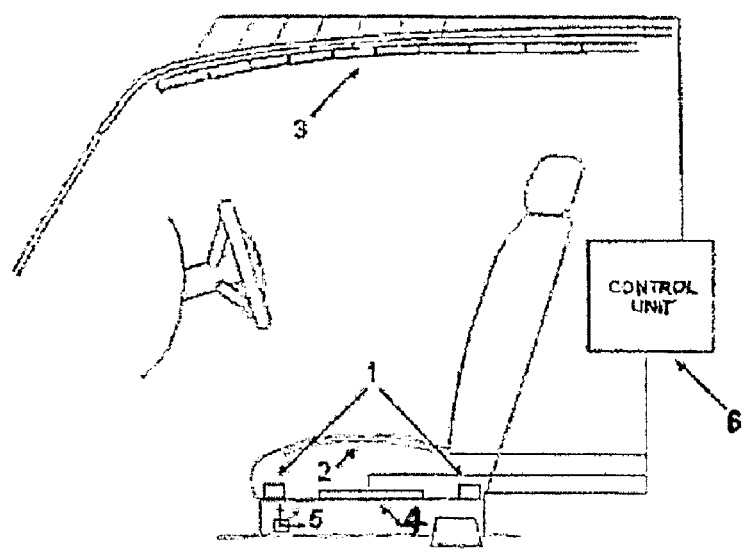
FIG. 1 shows the position of all of the transducers in a vehicle.

As FIG. 1 shows, the force/load sensors (1) are mounted in the four corners of the seat pan. The first electrode (2) of the head position sensor is mounted in a vehicle seat. The second electrode is an element of the array (3) mounted to the ceiling of the vehicle above the occupant's seat. A seat position sensor (4) is mounted between the seat pan and the supports. A three-direction acceleration sensor (5) is mounted rigidly under the seat. A control unit (6) continuously monitors all of the sensors. The control unit (6) utilizes an excitation method and a synchronous detection method to measure capacity. It uses a micro power low frequency signal that is safe for humans. The resulting weight measurement read by the force/load sensors is biased to account for body angle, foot position and external forces acting on the occupant.

Figure 2:
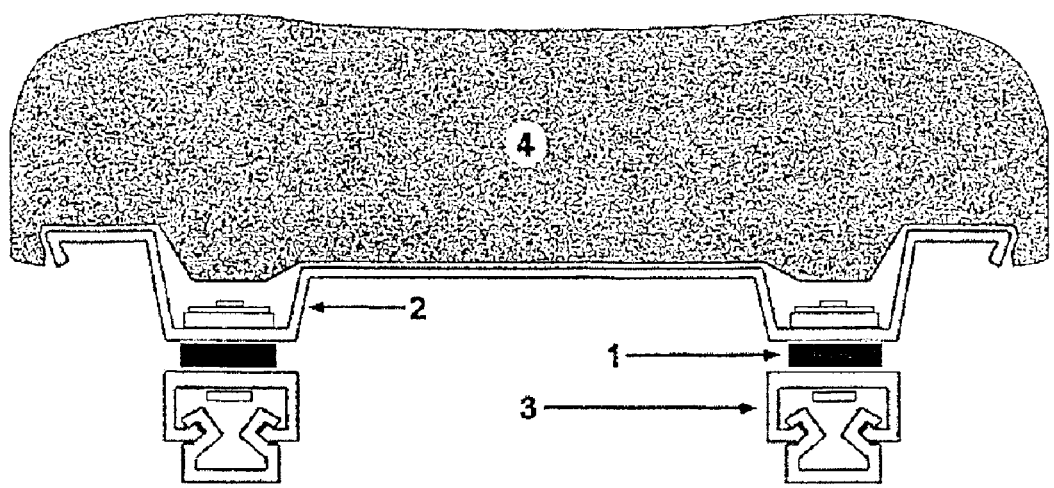
FIG. 2 shows the position of the weight sensors in the seat.

In the preferred system, the force/load transducers measure the weight distribution on the seat pan. A weight is measured on each corner of the seat pan. FIG. 2 shows the force/load transducers (1) are mounted on each corner of the seat pan (2), to the seat slide rails (3). These in turn connect to the seat frame. The configuration of these transducers allows the load on each corner of the seat pan to be determined. These sensors give the load distribution of the occupant on the seat, i.e. the forces acting on each corner of the seat pan). The sensors are covered by the seat cushion (4).

Figure 3:
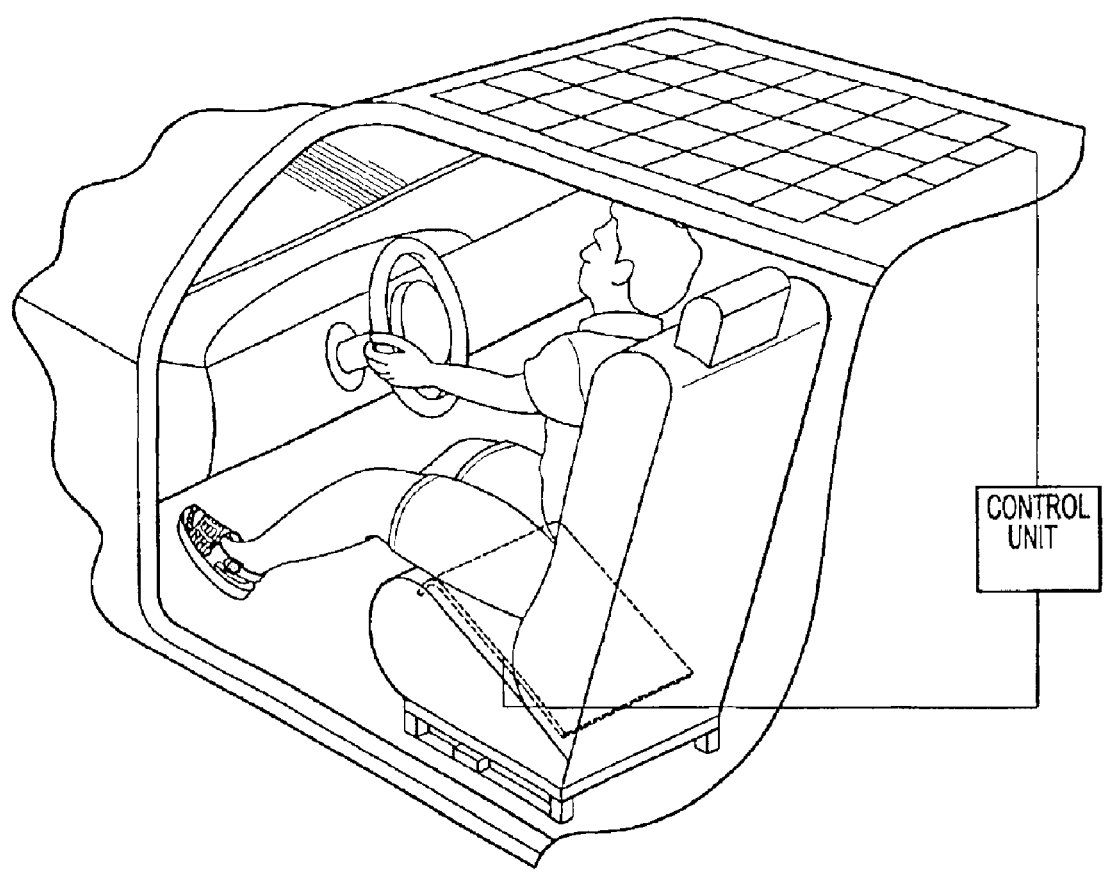
FIG. 3 shows the position of the capacitive electrodes.

The system provides an occupant head position sensor, which utilizes the human body's conductivity, to determine head position by measuring the capacity between the occupant's head and the roof-mounted array of sensors (electrodes). A ceiling-mounted occupant head position sensor may be incorporated in any type of vehicle that has a seat and a roof. Referring to FIG. 3, the principal components of the ceiling-mounted proximity sensor of the preferred system are: a set of electrodes mounted in the base portion of the seat; a ceiling-mounted array of second electrodes; a control unit which is connected to both the first and second set of electrodes to provide the necessary measurements and calculations. The seat-mounted electrode provides capacitive connection with the occupant many times greater than the capacity between the occupant's head and the roof-mounted array of electrodes. This connection allows for the consideration that the occupant is coupled to the seat electrode. The capacity between the occupant's head and the roof-mounted array of electrodes is a function of the distance between them. The control unit uses an excitation method to measure the said capacity.

The multi-axis acceleration transducer is used to determine if external forces, such as accelerations, are influencing the weight readings. These forces are measured in three directions: front-to-rear, side-to-side and up down. The acceleration in the front-to-rear direction allows the system to recognize if the vehicle is accelerating/braking or if the occupant is leaning forward or backwards. The acceleration in the side-to-side direction allows the system to recognize if the vehicle is turning on an off ramp (or swerving around an obstacle) or whether the occupant is leaning to the side. The acceleration in the up-down direction allows the system to recognize if the vehicle is going over bumps.

The system can also incorporate a seat inclination transducer to compensate for an occupant sitting in a seat that is tilted back. In this situation a great deal of the occupant's weight maybe supported by the backrest.

An intelligent controller monitors the force/load transducers and the acceleration transducers to determine the weight of the occupant, and compensating for false readings due to external forces and losses due to body angle and foot position. This invention provides a simple, reliable method of determining these factors and using them in conjunction with force/load sensors to accurately determine an occupant's size and weight.

Although the invention has been described in details with particular reference to these preference embodiments, other embodiments can achieve the same results. Variations and modifications of the present invention will be obvious to those skilled in the art and it is intended to cover in the appended claims all such modifications and equivalents.

What is claimed is:

1. A system for detecting the weight of an occupant in a vehicle seat comprising:
    at least one load sensor coupled to a seat having a seat bottom and a seat back;
    a position sensor determining the position of the occupant in the seat independently of a position of the seat back; and
    a controller determining the weight of the occupant based upon signals from the at least one load sensor and the position sensor, wherein the controller determines the body angle of the occupant based upon the signal from the position sensor and uses the body angle to bias measurements from the at least one load sensor in order to determine the weight of the occupant.

2. A system for detecting the weight of an occupant in a vehicle seat comprising:
    at least one load sensor coupled to a seat having a seat bottom and a seat back, wherein the at least one load sensor provides an indication of the load distribution on the vehicle seat;
    a position sensor determining the position of the occupant in the seat independently of a position of the seat back; and
    a controller determining the weight of the occupant based upon signals from the at least one load sensor and the position sensor.

3. The system of claim 2 wherein the at least one load sensor comprises four weight sensors.

4. A system for detecting the weight of an occupant in a vehicle seat comprising:
    at least one load sensor coupled to a seat having a seat bottom and a seat back;
    a position sensor determining the positon of the occupant in the seat independently of a position of the seat back;
    at least one acceleration transducer measuring acceleration and
    a controller determining the weight of the occupant based upon signals from the at least one load sensor and the position sensor and said controller determining the weight of the occupant based upon an acceleration signal from the acceleration transducer.

5. The system of claim 4 wherein the at least one acceleration transducer measures acceleration in three axes.

6. A system for detecting the weight of an occupant in a vehicle seat comprising:
    at least one load sensor coupled to a seat having a seat bottom and a seat back;
    a position sensor determining the position of the occupant in the seat independently of a position of the seat back;
    a vehicle seatback angle sensor; and
    a controller determining the weight of the occupant based upon signals from the at least one load sensor and the position sensor and said controller determining the weight of the occupant based upon a signal from the vehicle seatback angle sensor.

7. The system of claim 1 wherein the position sensor includes a seat electrode providing a connection to the occupant's body to transmit an electrical field.

8. The system of claim 7 wherein the position sensor further includes roof-mounted electrodes connected to the controller.

9. The system of claim 8 wherein the controller uses a signal from each roof-mounted electrode in the array to compute the proximity of the occupant.

10. A method for determining the weight of an occupant in the vehicle seat including the steps of:
    (a) measuring a load on the seating surface;
    (b) determining an angle of the occupant in the seat by determining a position of a head of the occupant; and
    (c) determining the weight of the occupant based upon the angle and the load.

11. The method of claim 10 wherein said step (b) further includes the step of determining the position of the occupant in the seat.

12. The method of claim 10 wherein said step (a) further includes the step of measuring load distribution on the vehicle seat.

13. The method of claim 10 wherein said step (a) further includes the step of measuring load at a plurality of locations on the seat.

14. The method of claim 10 further including the steps of:
    (d) measuring acceleration; and
    (e) determining the weight of the occupant in step (c) based upon said step (d).

15. The method of claim 14 wherein said step (d) further includes the step of measuring acceleration in a plurality of axes.

16. A method for determining the weight of an occupant in a vehicle seat including the steps of:
    (a) measuring load upon a seating surface;
    (b) measuring acceleration; and
    (c) determining the weight of the occupant based upon the measured acceleration and the measured load.

17. The method of claim 16 wherein said step (b) further includes the step of measuring acceleration in a plurality of axes.

18. The method of claim 16 wherein said step (b) further includes the step of measuring acceleration in a direction generally parallel to gravity, said step (c) further including the step of biasing the measured load based upon the measured acceleration.

19. The method of claim 16 wherein said step (b) further includes step of measuring acceleration in a direction generally perpendicular to gravity.

20. The method of claim 16 wherein further including the step of determining a position of the occupant's head and determining the weight in said step (c) based upon the position of the occupant's head.

21. The method of claim 10 further including the steps of determining a position of the seat and determining the weight of the occupant based upon the position of the seat.

* * * * *